United States Patent [19]

Le Rossignol

[11] Patent Number: 5,645,922

[45] Date of Patent: Jul. 8, 1997

[54] IMPERMEABLE ELASTIC MEMBRANE

[75] Inventor: Benoit Le Rossignol, Rennes, France

[73] Assignees: Automobiles Peugeot, Paris; Automobiles Citroen, Neuilly Sur Seine, both of France

[21] Appl. No.: 180,381

[22] Filed: Jan. 12, 1994

[30] Foreign Application Priority Data

Jan. 13, 1993 [FR] France ................... 93 00252

[51] Int. Cl.$^6$ ............................. B32B 27/30; B32B 27/34
[52] U.S. Cl. ................. 428/226; 138/26; 138/30; 428/337; 428/476.3; 428/515; 524/557
[58] Field of Search ............... 138/30, 26; 428/476.3, 428/515, 219, 220, 332, 337; 524/557

[56] References Cited

U.S. PATENT DOCUMENTS 5,215,124  6/1993  Hattori et al. ............... 138/30

FOREIGN PATENT DOCUMENTS 0 360 648  3/1990  European Pat. Off. .
0 482 916  4/1992  European Pat. Off. .
2 662 638  12/1991  France .

OTHER PUBLICATIONS

Patent Abstracts of Japan, vol. 013, No. 287, (M–844), 30 Jun. 1989, & JP-A-10 79 438 (Dainippon Printing Co Ltd), 24 Mar. 1989.

C.A. Finch, "Polyvinyl Alcohol Properties and Applications," A Wiley–Interscience Publication, Wiley & Sons (1973) 352–388, 523–528.

*Primary Examiner*—D. S. Nakarani
*Attorney, Agent, or Firm*—Burns, Doane, Swecker & Mathis, L.L.P.

[57] ABSTRACT

An impermeable elastic membrane for hydropneumatic accumulators is made from an impermeable film of completely hydrolyzed polyvinyl alcohol, with a high molecular weight, and plasticized, with protective layers on both sides of polyamide, ethylene vinyl alcohol, or ethylene vinyl acetate. The membrane may be used in the hydropneumatic suspension of an automobile. The film can be obtained by extrusion, by injection molding, or by pressure molding.

9 Claims, 1 Drawing Sheet

IMPERMEABLE ELASTIC MEMBRANE

BACKGROUND OF THE INVENTION

The invention pertains to an impermeable elastic membrane of the type which is used in hydropneumatic accumulators to separate gas and liquid compartments.

European Patent EP0360648 describes such a membrane, and, in particular, a sandwich membrane, which is comprised of a film of gas impermeable material, preferably polyvinyl alcohol, included between two layers of an elastic material such as polyurethane.

The polyvinyl alcohol films which are used, especially in the field of packing materials, are obtained by lamination in a thickness from 25 to 100 microns. These films are not sufficiently resistant to be used for making hydropneumatic accumulator membranes which operate at pressures on the order of 200 bars.

In order to obtain films of sufficient thickness, on the order of 450 to 1400 microns, successive layers are produced by laminating a large number of thin films as mentioned in European Patent EP0482916.

On the other hand, it is known that the thick partially hydrolyzed polyvinyl alcohol films which are generally used, obtained by lamination or by extrusion, are porous because of the escape of volatile substances caused by heating in a non-anhydrous medium.

The escaping gases are produced according to the following mechanism:

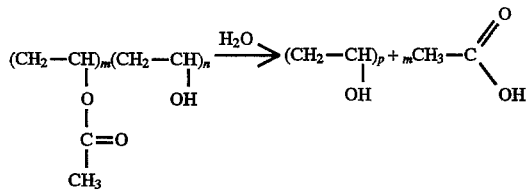

OBJECTS AND SUMMARY OF THE INVENTION

An object of the present invention is to provide an impermeable elastic membrane suitable for use in a hydropneumatic accumulator to separate gas-filled and liquid-filled compartments where the membrane does not have the aforementioned disadvantages.

An impermeable elastic membrane accomplishing this and other objects is characterized by the fact that it is made from an impermeable film obtained by extrusion, by injection molding, or by pressure molding of completely hydrolyzed polyvinyl alcohol which has a high molecular weight and may be plasticized.

According to another characteristic, the complete hydrolysis of the polyvinyl alcohol is obtained from polyvinyl acetate through the following reaction:

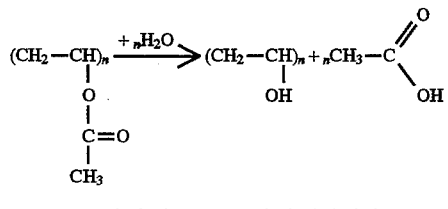

A polyvinyl acetate    polyvinyl alcohol

According to yet another characteristic, the completely hydrolyzed polyvinyl alcohol is plasticized, preferably in glycerin at a rate up to 35%.

The plasticized and completely hydrolyzed polyvinyl alcohol film may be extruded in a single operation with a thickness from 450 to 1400 microns.

According to one embodiment, the extruded polyvinyl alcohol film which is used to make the membrane is protected on its two sides by a coating selected from the group consisting of polyamide, ethylene vinyl alcohol, and ethylene vinyl acetate, obtained by coextrusion at the same time as the polyvinyl alcohol film.

According to another embodiment, the membrane is obtained by injection molding, or pressure molding. The completely hydrolyzed and plasticized polyvinyl alcohol may be directly molded to its final shape in the procedure and placed between two protective rubber layers. Injection molding is preferably carried out at a pressure of approximately 150 bars and a temperature of approximately 220° C. Injection molding offers the advantage of providing a membrane of a constant and controlled thickness, which in turn has the effect of improving the qualities of impermeability and elasticity. In addition, the membrane is obtained in its final shape directly from mold instead of being made separately from the film. As the membrane comes out of the mold one only has to coat it on two sides with a suitable adhesive in order to ensure adhesion with the two rubber layers, which are also in the mold, and between which it will be placed, before vulcanization of the assembly under pressure. The vulcanization can be carried out at a temperature of approximately 155° C. in approximately 12 minutes.

An inspection of the polyvinyl alcohol decomposition made by DSC (Differential Scanning Calorimetry) reveals the following decomposition temperatures:

Partially hydrolyzed polyvinyl alcohol: 180°–190° C.

complete hydrolyzed polyvinyl alcohol: 230°–240° C.

One can see that the polyvinyl alcohol is completely hydrolyzed at a decomposition temperature greater than the temperature used for the implementation.

BRIEF DESCRIPTION OF THE DRAWINGS

Other objects and advantages of the present invention will be apparent to those skilled in the art when this specification is read in conjunction with the attached drawings wherein like reference numerals are applied to like elements and wherein.

DESCRIPTION OF THE PREFERRED EMBODIMENTS

Figure 1:
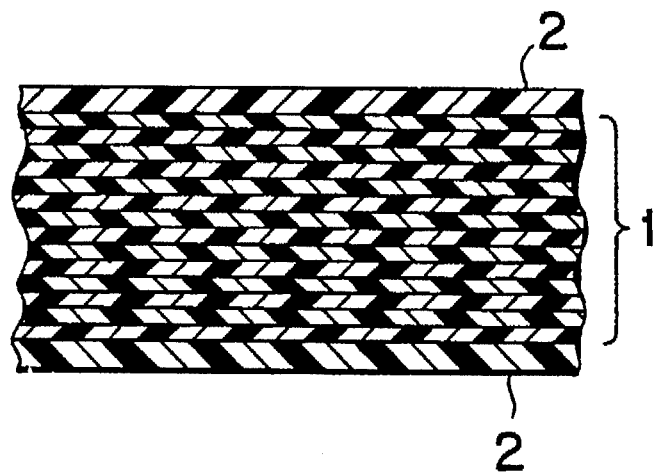
FIG. 1 is a cross-sectional view of a membrane according to the known process.

One can see in FIG. 1 a membrane obtained by successive laminated layers of a plurality of films 1 whose thicknesses are approximately 90 microns. In the example given, 14 layers are superimposed to obtain the desired thickness. The assembly is then further covered by lamination by two protective layers 2.

Figure 2:
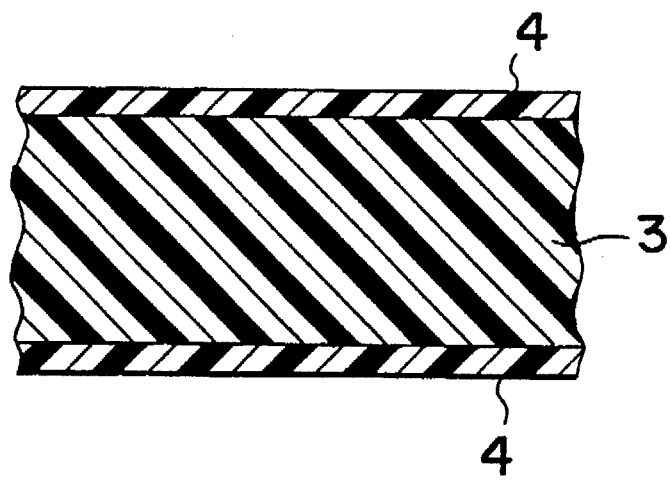
FIG. 2 is a cross-sectional view of a membrane according to the invention.

In FIG. 2 one can see a sectional view of the membrane according to the invention, obtained by co-extrusion of a polyvinyl alcohol film 3 whose thickness is approximately 1200 microns, and of its two protective layers 4 of polyamide or ethylene vinyl alcohol or ethylene vinyl acetate.

An impermeable elastic membrane accomplishing this and other objects is characterized by the fact that it is made from an impermeable film obtained by extrusion, by injection molding, or by pressure molding of completely hydrolyzed polyvinyl alcohol which has a high molecular weight and may be laminated.

According to another characteristic, the complete hydrolysis of the polyvinyl alcohol is obtained from vinyl polyacetate through the following reaction:

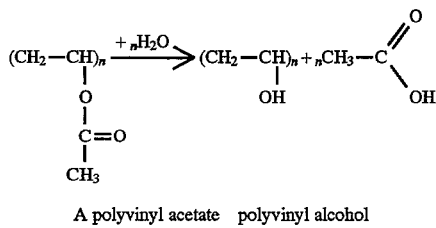

A polyvinyl acetate   polyvinyl alcohol

According to yet another characteristic, the completely hydrolyzed polyvinyl alcohol is plasticized, preferably in glycerin at a rate up to 35%.

The plasticized and completely hydrolyzed polyvinyl alcohol film may be extruded in a single operation with a thickness from 450 to 1400 microns.

According to one embodiment, the extruded polyvinyl alcohol film which is used to make the membrane is protected on its two sides by a coating selected from the group consisting of polyamide, ethylene vinyl alcohol, or ethylene vinyl acetate, obtained by coextrusion at the same time as the polyvinyl alcohol film.

According to another embodiment, the membrane is obtained by injection molding, or pressure molding. The completely hydrolyzed and plasticized polyvinyl alcohol may be directly molded in the procedure and placed between two protective rubber layers. Injection molding is preferably carried out at a pressure of approximately 150 bars and a temperature of approximately 220° C. Injection molding offers the advantage of providing a membrane of a consistent and controlled thickness, which in turn has the effect of improving the qualities of impermeability and elasticity. In addition, the membrane is obtained directly in the mold instead of being made separately from the film. As the membrane comes out of the mold one only has to coat it on two sides with a suitable adhesive in order to ensure adhesion with the two rubber layers, which are also in the mold, and between which it will be placed, before vulcanization of the assembly under pressure. The vulcanization can be carried out at a temperature of approximately 155° C. in approximately 12 minutes.

An inspection of the polyvinyl alcohol decomposition made by DSC (Differential Scanning Calorimetry) reveals the following decomposition temperatures:

Polyvinyl alcohol partially hydrolyzed: 180°–190° C.

Polyvinyl alcohol completely hydrolyzed: 230°–240° C.

A permeability test was carried out on different membranes under identical conditions by applying a pressure of 50 bars on one side of the membrane without any counter pressures, the membrane resting on a wall consisting of porous balls. The pressure drop was measured in millibars per second.

This test yielded the following results:

polyurethane membrane (known solution):

$225 \times 10^{-4}$ mbar/s membrane extrude with film (according to the invention):

$35 \times 10^{-4}$ mbar/s membrane laminated with film (several layers):

$35 \times 10^{-4}$ mbar/s membrane molded with film under pressure (according to the invention):

$12 \times 10^{-4}$ mbar/s

One can see that membranes made by injection pressure molding have the best impermeability.

The membrane laminated in several layers and the membrane extruded or co-extruded with its protective coating have equivalent impermeability results. However, the membrane extruded or co-extruded with its protective coating has the advantage of reduced manufacturing cost because a desired thickness of the film and its protective coating are obtained in a single operation by co-extrusion.

It will now be seen that a new impermeable elastic membrane has been disclosed which overcomes problems of the type associated with the prior art membranes. Moreover, it will be apparent to those skilled in the art that there are numerous modifications, variations, substitutions, and equivalents for features of the invention which do not materially depart from the spirit and scope of the invention. Accordingly, it is expressly intended that all such modifications, variations, substitutions, and equivalents for features of the invention which fall within the spirit and scope of the invention as defined in the appended claims be embraced thereby.

What is claimed is:

1. An impermeable elastic membrane for use in a hydropneumatic accumulator to separate gas and liquid compartments, said membrane being 450 to 1400 microns thick layer gas-impermeable film of plasticized completely hydrolyzed polyvinyl acetate.

2. The impermeable elastic membrane according to claim 1, wherein complete hydrolysis of the polyvinyl alcohol is obtained according to the following reaction:

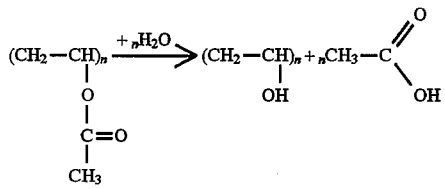

3. The impermeable elastic membrane according to claim 2, wherein the completely hydrolyzed polyvinyl acetate is plasticized with glycerin at a rate up to 35% by weight.

4. The impermeable membrane according to claim 3, wherein the film is extruded in a single operation.

5. The impermeable membrane according to claim 4, wherein the film is protected on its two sides by a coating selected from the group consisting of polyamide, ethylene vinyl alcohol, and ethylene vinyl acetate obtained by co-extrusion at the same time as the polyvinyl alcohol film.

6. The impermeable membrane according to claim 3, wherein the membrane is obtained by injection or pressure molding of completely hydrolyzed and plasticized polyvinyl acetate which is molded directly with its final shape.

7. The impermeable membrane according to claim 6, wherein the membrane is molded under a pressure of approximately 150 bars and at a temperature of approximately 220° C.

8. The impermeable membrane according to claim 7, wherein the membrane is coated with a suitable adhesive which is used to adhere the membrane to rubber.

9. The impermeable membrane according to claim 8, wherein the membrane is placed between two layers of shaped protective rubber and then vulcanized under pressure for approximately 12 minutes at 155° C.

* * * * *